United States Patent
Tanaka

(10) Patent No.: US 10,508,958 B2
(45) Date of Patent: Dec. 17, 2019

(54) SEMICONDUCTOR PRESSURE SENSOR WITH PIEZO-RESISTIVE PORTIONS WITH CONDUCTIVE SHIELDS

(71) Applicant: FUJI ELECTRIC CO., LTD., Kanagawa (JP)

(72) Inventor: Takahide Tanaka, Matsumoto (JP)

(73) Assignee: FUJI ELECTRIC CO., LTD., Kanagawa (JP)

(*) Notice: Subject to any disclaimer, the term of this patent is extended or adjusted under 35 U.S.C. 154(b) by 0 days.

(21) Appl. No.: 15/907,292

(22) Filed: Feb. 28, 2018

(65) Prior Publication Data
US 2018/0266901 A1 Sep. 20, 2018

(30) Foreign Application Priority Data

Mar. 16, 2017 (JP) ................................. 2017-051244
Jan. 15, 2018 (JP) ................................. 2018-004375

(51) Int. Cl.
*G01L 1/18* (2006.01)

(52) U.S. Cl.
CPC ................ *G01L 1/183* (2013.01); *G01L 1/18* (2013.01)

(58) Field of Classification Search
CPC ..................................................... G01L 1/183
See application file for complete search history.

(56) References Cited

U.S. PATENT DOCUMENTS

| | | | | |
|---|---|---|---|---|
| 5,231,301 A * | 7/1993 | Peterson | ............... | G01L 9/0054 257/364 |
| 6,218,717 B1 * | 4/2001 | Toyoda | ................. | G01L 9/0042 257/418 |
| 6,747,329 B2 * | 6/2004 | Yoshihara | ............. | G01L 9/0042 257/419 |
| 7,448,278 B2 * | 11/2008 | Hsieh | ..................... | G01L 9/0054 438/53 |
| 8,809,975 B2 * | 8/2014 | Niimura | .................... | G01L 9/00 257/419 |
| 9,790,085 B1 * | 10/2017 | Bilic | ...................... | B81B 7/0064 |
| 2002/0003274 A1 * | 1/2002 | Bryzek | ................. | G01L 9/0054 257/414 |
| 2006/0278012 A1 | 12/2006 | Fujimoto et al. | | |
| 2013/0264664 A1 | 10/2013 | Nimura et al. | | |

FOREIGN PATENT DOCUMENTS

| | | |
|---|---|---|
| JP | H02-41183 A | 2/1990 |
| JP | 2006-329929 | 12/2006 |
| JP | 2012-127793 A | 7/2012 |
| WO | 2012/080811 | 6/2012 |

* cited by examiner

*Primary Examiner* — Nathaniel T Woodward

(57) ABSTRACT

The potential difference between a piezo-resistive portion and a shield film is to be reduced. A semiconductor device is provided, including: a semiconductor substrate having provided therein a hollowed portion, a piezo-resistive portion provided in a region of the semiconductor substrate above the hollowed portion; an insulating film provided above the piezo-resistive portion; and a conductive shield film provided above the piezo-resistive portion with the insulating film intervening therebetween, wherein two different parts of the shield film are connected to different potentials. In this manner, the potential difference between a piezo-resistive portion and a shield film can be reduced.

15 Claims, 15 Drawing Sheets

SEMICONDUCTOR PRESSURE SENSOR WITH PIEZO-RESISTIVE PORTIONS WITH CONDUCTIVE SHIELDS

The contents of the following Japanese patent applications are incorporated herein by reference:
NO. 2017-051244 filed on Mar. 16, 2017, and
NO. 2018-004375 filed on Jan. 15, 2018.

BACKGROUND

1. Technical Field

The present invention relates to a semiconductor device.

2. Related Field

Semiconductor devices are known in which a piezo-resistive portion is placed on a diaphragm formed in a silicon substrate. The resistance value of the piezo-resistive portion varies due to the diaphragm being distorted. The variation amount of the resistance value is output as an electrical signal. By placing a shield film above the piezo-resistive portion with an insulating film intervening therebetween, the effect of electrical charge on the piezo-resistive portion is mitigated.

A configuration is known in which a plurality of piezo-resistive portions are covered by one shield film and the shield film is set at a constant reference potential (Patent Document 1). A configuration is also known in which a plurality of shield films are individually provided above respective ones of a plurality of piezo-resistive portions (Patent Document 2). In the configuration of Patent Document 2, shield films formed above respective piezo-resistive portions connected to a high-potential side terminal of a Wheatstone bridge circuit are electrically connected to each other. Also, shield films formed above respective piezo-resistive portions connected to a low-potential side terminal of the Wheatstone bridge circuit are electrically connected to each other. The shield films formed above the respective piezo-resistive portions connected to the high-potential side terminal and the shield films formed above the respective piezo-resistive portions connected to the low-potential side terminal are fixed at different potentials (Patent Document 2).

Patent Document 1: Japanese Patent Application Publication No. 2006-329929
Patent Document 2: WO No. 2012/080811

When current flows through piezo-resistive portions, the potential varies with position in one piezo-resistive portion due to voltage drop, while the shield film above the piezo-resistive portion is fixed at a constant potential regardless of position. Accordingly, the potential difference between a piezo-resistive portion and a shield film varies with position in the piezo-resistive portion. The potential difference between a piezo-resistive portion and a shield film affects the resistance value and temperature characteristics of the piezo-resistive portion. Accordingly, it is preferable to mitigate the potential difference between a piezo-resistive portion and a shield film in the semiconductor device.

SUMMARY

A first aspect of the present invention provides a semiconductor device. The semiconductor device includes a semiconductor substrate, a piezo-resistive portion, an insulating film and a shield film. The semiconductor substrate may have provided therein a hollowed portion. The piezo-resistive portion may be provided in a region of the semiconductor substrate above the hollowed portion. The insulating film may be provided above the piezo-resistive portion. The conductive shield film may be provided above the piezo-resistive portion with the insulating film intervening therebetween. Two different parts of the shield film may be connected to different potentials.

A potential difference may be generated in the shield film in a direction same as a direction of a potential difference generated in the piezo-resistive portion.

The semiconductor device may include a plurality of piezo-resistive portions constituting a Wheatstone bridge circuit. The plurality of piezo-resistive portions may include a first resistor, a second resistor, a third resistor and a fourth resistor. The first resistor may be electrically connected between a high-potential side terminal of the Wheatstone bridge circuit and a first middle-potential terminal of the Wheatstone bridge circuit. The second resistor may be electrically connected between the first middle-potential terminal and a low-potential side terminal of the Wheatstone bridge circuit. The third resistor may be electrically connected between the high-potential side terminal and a second middle-potential terminal of the Wheatstone bridge circuit. The fourth resistor may be electrically connected between the second middle-potential terminal and the low-potential side terminal. A plurality of shield films, each of which is the shield film, may be provided above respective ones of the plurality of piezo-resistive portions with the insulating film intervening therebetween. Two of the shield films may be connected in series between the high-potential side terminal and the low-potential side terminal.

The shield films may include a first shield film, a second shield film, a third shield film and a fourth shield film. The first shield film, the second shield film, the third shield film and the fourth shield film may be provided above respective ones of the first resistor, the second resistor, the third resistor and the fourth resistor. One end of the first shield film and one end of the third shield film may each be electrically connected to the high-potential side terminal of the Wheatstone bridge circuit. One end of the second shield film and one end of the fourth shield film may each be electrically connected to the low-potential side terminal of the Wheatstone bridge circuit.

Another end of the first shield film and another end of the second shield film may be electrically connected. Another end of the third shield film and another end of the fourth shield film may be electrically connected.

Another end of the first shield film and another end of the fourth shield film may be electrically connected. Another end of the third shield film and another end of the second shield film may be electrically connected.

Another end of the first shield film, another end of the second shield film, another end of the third shield film and another end of the fourth shield film may be electrically connected to each other.

Another end of the first shield film, another end of the second shield film, another end of the third shield film and another end of the fourth shield film may be electrically connected to the first middle-potential terminal or the second middle-potential terminal.

The semiconductor device may further include a resistance wiring portion. The resistance wiring portion may be a diffused resistor. The resistance wiring portion may be connected to the piezo-resistive portion. The semiconductor device may further include a wiring portion. The wiring portion may be connected to the shield film. In plan view, the shield film and the wiring portion may have a smaller area than the piezo-resistive portion and the resistance wiring portion.

The semiconductor device may further include a wiring portion. The wiring portion may be connected to the shield film. The wiring portion may have a lower resistance value than a resistance value of the shield film. The shield film and the wiring portion may be formed of a polysilicon material that is continuous with each other. A cross-sectional area of the wiring portion may be larger than a cross-sectional area of the shield film.

The semiconductor device may further include a wiring portion. The wiring portion may be connected to the shield film. The wiring portion may have a lower resistance value than a resistance value of the shield film. A polysilicon portion constituting the shield film may have a smaller thickness than a polysilicon portion constituting the wiring portion.

The shield film and the wiring portion may be formed of a polysilicon material that is continuous with each other. A doping concentration of the wiring portion may be higher than a doping concentration of the shield film.

The shield film may be formed of polysilicon. The wiring portion may be formed of metal.

A sheet resistance value of the shield film may be 10 Ω/square or more and 10 kΩ/square or less.

The summary clause does not necessarily describe all necessary features of the embodiments of the present invention. The present invention may also be a sub-combination of the features described above.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
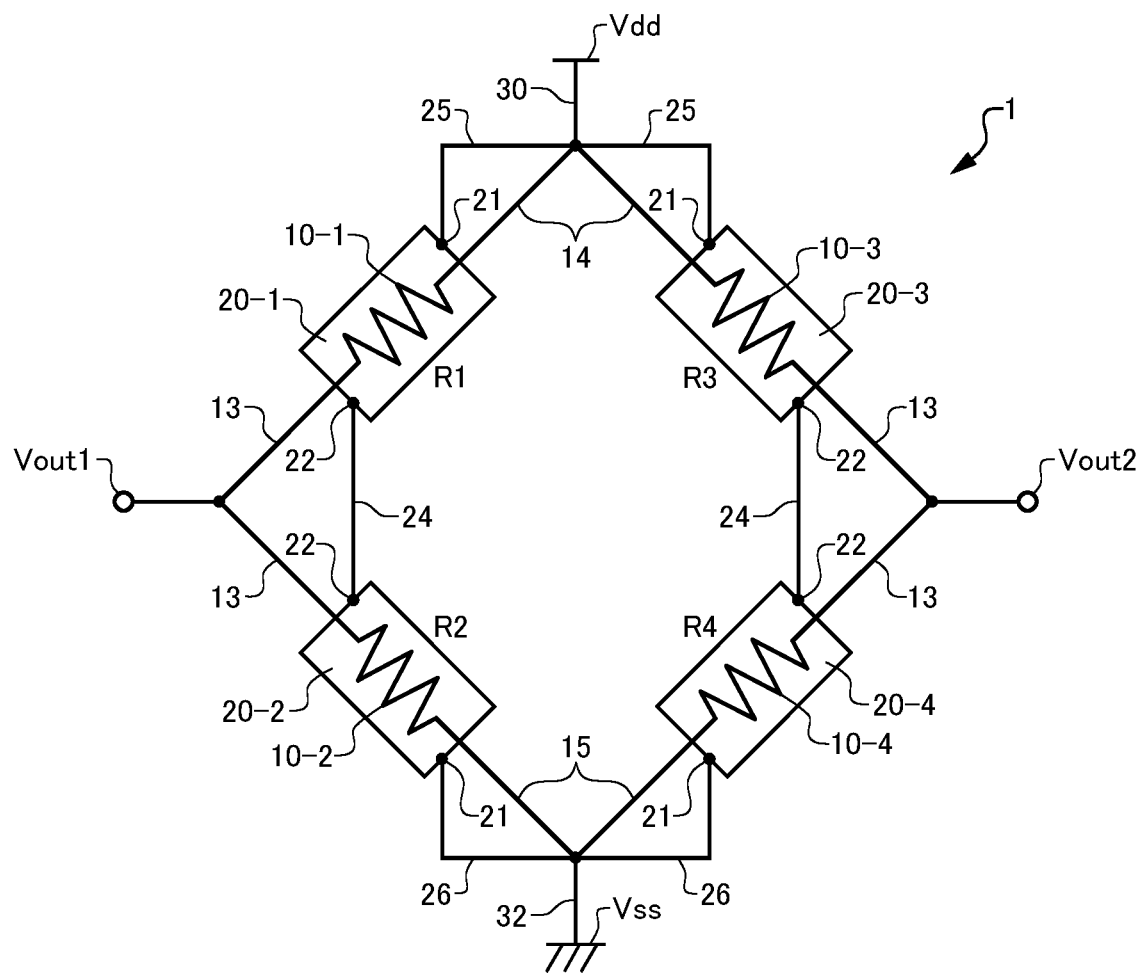
FIG. 1 shows an example of the circuit configuration of a semiconductor pressure sensor 1 according to a first embodiment.

FIG. 1 shows an example of the circuit configuration of a semiconductor pressure sensor 1 according to a first embodiment. The semiconductor pressure sensor 1 is an example of a semiconductor device. The semiconductor pressure sensor 1 includes a plurality of piezo-resistive portions 10 and a plurality of shield films 20. The semiconductor pressure sensor 1 includes a plurality of piezo-resistive portions 10-1, 10-2, 10-3 and 10-4 (which may be hereinafter collectively referred to as a plurality of piezo-resistive portions 10) constituting a Wheatstone bridge circuit. In FIG. 1, the plurality of piezo-resistive portions 10 are denoted as a first resistor R1, a second resistor R2, a third resistor R3 and a fourth resistor R4.

The piezo-resistive portion 10 may be a diffused resistor formed in a semiconductor substrate. The semiconductor substrate may be a silicon substrate, or may be a compound semiconductor substrate of silicon carbide (SiC) or the like. The piezo-resistive portion 10 may be formed by selectively doping p-type or n-type dopants into the semiconductor substrate and also performing a thermal diffusion.

The first resistor R1 is electrically connected between a high-potential side terminal Vdd of the Wheatstone bridge circuit and a first middle-potential terminal Vout1 of the Wheatstone bridge circuit. The second resistor R2 is electrically connected between the first middle-potential terminal Vout1 and a low-potential side terminal Vss of the Wheatstone bridge circuit. The third resistor R3 is electrically connected between the high-potential side terminal Vdd and a second middle-potential terminal Vout2 of the Wheatstone bridge circuit. The fourth resistor is electrically connected between the second middle-potential terminal Vout2 and the low-potential side terminal Vss.

The high-potential side terminal Vdd may be connected to a higher power supply. The low-potential side terminal Vss may be connected to a ground potential. The first middle-potential terminal Vout1 and the second middle-potential terminal Vout2 may be output terminals of the Wheatstone bridge circuit. The first middle-potential terminal Vout1 and the second middle-potential terminal Vout2 each exhibit a potential that is higher than the potential of the low-potential side terminal Vss and lower than the potential of the high-potential side terminal Vdd. The first middle-potential terminal Vout1 exhibits a potential obtained by dividing the potential difference between the high-potential side terminal Vdd and the low-potential side terminal Vss based on the resistance ratio of the first resistor R1 and the second resistor R2. Similarly, the second middle-potential terminal Vout2 exhibits a potential obtained by dividing the potential difference between the high-potential side terminal Vdd and the low-potential side terminal Vss based on the resistance ratio of the third resistor R3 and the fourth resistor R4.

One end of the first resistor R1 and one end of the third resistor R3 may be electrically connected to the high-potential side terminal Vdd via a resistive-portion wiring 14.

One end of the second resistor R2 and one end of the fourth resistor R4 may be electrically connected to the low-potential side terminal Vss via a resistive-portion wiring 15. The other end of the first resistor R1 and the other end of the second resistor R2 may be connected to the first middle-potential terminal Vout1 via a resistive-portion wiring 13. The other end of the third resistor R3 and the other end of the fourth resistor R4 may be connected to the second middle-potential terminal Vout2 via another resistive-portion wiring 13.

Current flows from the high-potential side terminal Vdd toward the low-potential side terminal Vss through the first resistor R1 and the second resistor R2. Voltage drop occurs due to current flowing through the first resistor R1 and the second resistor R2. Accordingly, one end of the first resistor R1 connected to the resistive-portion wiring 14 is at a higher potential than the other end connected to the resistive-portion wiring 13. One end of the second resistor R2 connected to the resistive-portion wiring 15 is connected to a lower potential than the other end connected to the resistive-portion wiring 13.

Similarly, current flows from the high-potential side terminal Vdd toward the low-potential side terminal Vss through the third resistor R3 and the fourth resistor R4. Voltage drop occurs due to current flowing through the third resistor R3 and the fourth resistor R4. Accordingly, one end of the third resistor R3 connected to the resistive-portion wiring 14 is at a higher potential than the other end connected to the resistive-portion wiring 13. One end of the fourth resistor R4 connected to the resistive-portion wiring 15 is at a lower potential than the other end connected to the resistive-portion wiring 13.

The shield films 20 are provided above respective ones of the plurality of piezo-resistive portions 10. The shield films 20 include a first shield film 20-1, a second shield film 20-2, a third shield film 20-3 and a fourth shield film 20-4. The first shield film 20-1, the second shield film 20-2, the third shield film 20-3 and the fourth shield film 20-4 may be individually provided above respective ones of the first resistor R1, the second resistor R2, the third resistor R3 and the fourth resistor R4 with an insulating film, which will be described later, intervening therebetween.

Each of the plurality of shield films 20 may be formed of a conductive material such as polysilicon. In the present example, two different parts of the shield film 20 are connected to different potentials, and therefore current flows in the shield film 20. Accordingly, the shield film 20 used is a resistive shield film having a predetermined sheet resistance value such that one end and the other end of the shield film 20 are not short-circuited.

In the present example, one end 21 of the first shield film 20-1 and one end 21 of the third shield film 20-3 are each electrically connected to the high-potential side terminal Vdd of the Wheatstone bridge circuit via a wiring portion 25. One end 21 of the second shield film 20-2 and one end 21 of the fourth shield film 20-4 are each electrically connected to the low-potential side terminal Vss of the Wheatstone bridge circuit via a wiring portion 26.

In the present example, the other end 22 of the first shield film 20-1 and the other end 22 of the second shield film 20-2 are electrically connected. The other end 22 of the third shield film 20-3 and the other end 22 of the fourth shield film 20-4 are electrically connected. Accordingly, in the present example, two shield films, that is, the first shield film 20-1 and the second shield film 20-2 are connected in series between the high-potential side terminal Vdd and the low-potential side terminal Vss. Similarly, two shield films, that is, the third shield film 20-3 and the fourth shield film 20-4 are connected in series between the high-potential side terminal Vdd and the low-potential side terminal Vss.

In the present example, the first resistor R1 and the second resistor R2 are electrically connected in series, and the first shield film 20-1 and the second shield film 20-2 provided above them are electrically connected in series to each other. Similarly, the third resistor R3 and the fourth resistor R4 are electrically connected in series, and the third shield film 20-3 and the fourth shield film 20-4 provided above them are electrically connected in series to each other.

In the present example, current flows in each of the first shield film 20-1, second shield film 20-2, the third shield film 20-3 and the fourth shield film 20-4. Current flows from the high-potential side terminal Vdd toward the low-potential side terminal Vss through the first shield film 20-1 and the second shield film 20-2. Voltage drop occurs due to current flowing through the first shield film 20-1 and the second shield film 20-2. Accordingly, one end 21 of the first shield film 20-1 connected to the wiring portion 25 is at a higher potential than the other end 22 connected to the wiring portion 24. One end 21 of the second shield film 20-2 connected to the wiring portion 26 is at a lower potential than the other end 22 connected to the wiring portion 24.

Similarly, current flows from the high-potential side terminal Vdd toward the low-potential side terminal Vss through the third shield film 20-3 and the fourth shield film 20-4. Voltage drop occurs due to current flowing through the third shield film 20-3 and the fourth shield film 20-4. Accordingly, one end 21 of the third shield film 20-3 connected to the wiring portion 25 is at a higher potential than the other end 22 connected to the wiring portion 24. One end 21 of the fourth shield film 20-4 connected to the wiring portion 26 is at a lower potential than the other end 22 connected to the wiring portion 24.

Accordingly, two different parts of the first shield film 20-1 are connected to different potentials. Similarly, two different parts of each of the second shield film 20-2, the third shield film 20-3 and the fourth shield film 20-4 are also connected to different potentials.

A potential difference is generated in the first shield film 20-1 in the same direction as the direction of the potential difference generated in the first resistor R1. Similarly, for the second resistor R2, the third resistor R3 and the fourth resistor R4, a potential difference is generated in each shield film 20 in the same direction as the direction of the potential difference generated in the corresponding piezo-resistor. The resistive-portion wiring 14 and the wiring portion 25 may be connected to the high-potential side terminal Vdd through a metal wiring 30. Similarly, the resistive-portion wiring 15 and the wiring portion 26 may be connected to the low-potential side terminal Vss through a metal wiring 32.

Figure 2:
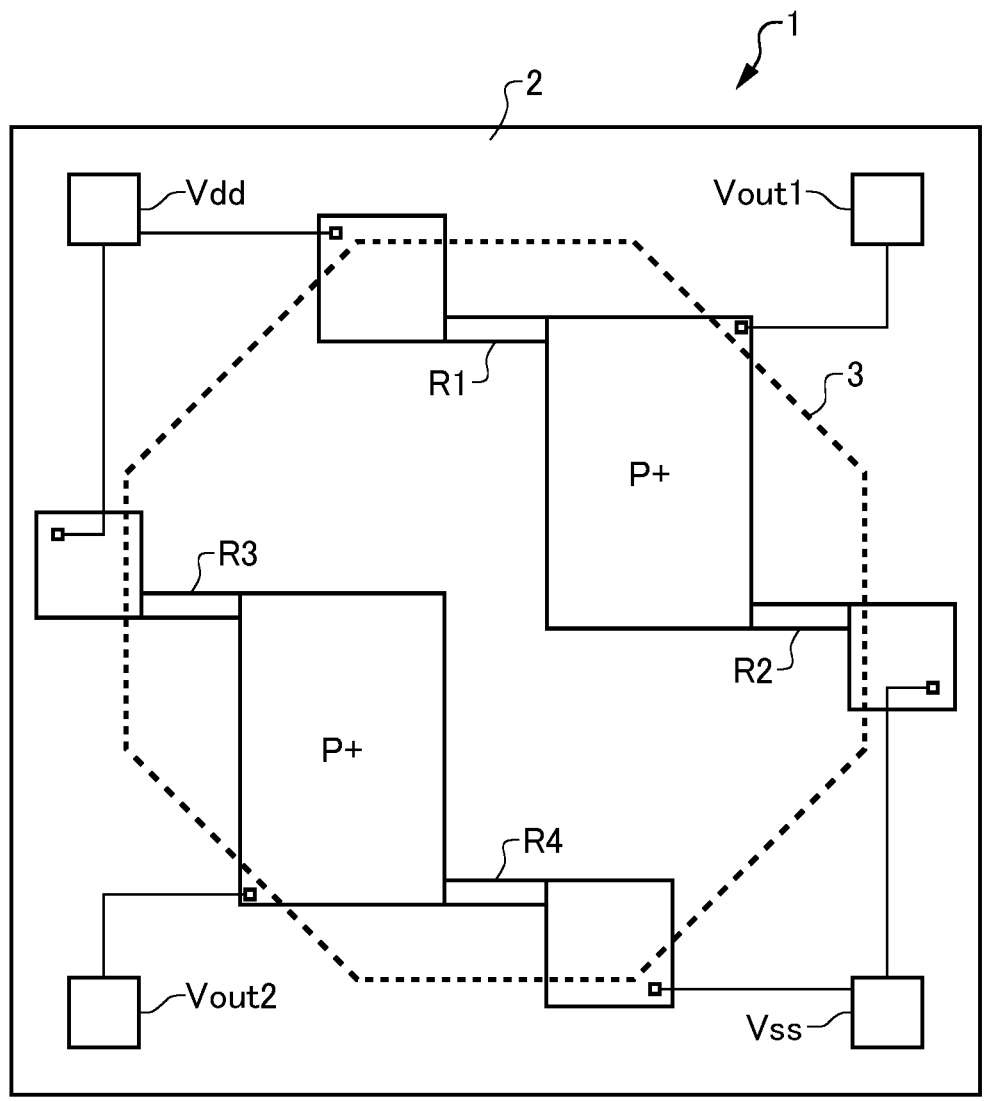
FIG. 2 shows the configuration of the semiconductor pressure sensor 1 according to the first embodiment.

FIG. 2 shows the configuration of the semiconductor pressure sensor 1 according to the first embodiment. The semiconductor pressure sensor 1 includes a semiconductor substrate 2 having provided therein a hollowed portion 3. In FIG. 2, the hollowed portion 3 is indicated by dotted line. At the hollowed portion 3 which is the region enclosed by dotted line, the thickness of the semiconductor substrate 2 is smaller than outside the region enclosed by dotted line. A portion of the semiconductor substrate 2 positioned above the hollowed portion 3 has a smaller thickness than a portion of the semiconductor substrate 2 positioned outside the region enclosed by dotted line, and is therefore easily displaced by pressure. The portion of the semiconductor substrate 2 positioned above the hollowed portion 3 functions as a diaphragm.

A plurality of piezo-resistive portions 10, that is, the first resistor R1, the second resistor R2, the third resistor R3 and the fourth resistor R4 may be provided in a region of the semiconductor substrate 2 above the hollowed portion 3. In the present example, the region of the hollowed portion 3 has a polygonal shape in plan view. In the present example, the region of the hollowed portion 3 has an octagonal shape in plan view. In each of a plurality of piezo-resistive portions 10, that is, the first resistor R1, the second resistor R2, the third resistor R3, and the fourth resistor R4, current may flow in the longitudinal direction. The first resistor R1 may be arranged such that the longitudinal direction of the first resistor R1 is along one side of the hollowed portion 3 adjacent to the first resistor R1. Similarly, the fourth resistor R4 may be arranged such that the longitudinal direction of the fourth resistor R4 is along one side of the hollowed portion 3 adjacent to the fourth resistor R4. On the other hand, the second resistor R2 may be arranged such that the longitudinal direction of the second resistor R2 intersects one side of the hollowed portion 3 adjacent to the second resistor R2. The third resistor R3 may be arranged such that the longitudinal direction of the third resistor R3 intersects one side of the hollowed portion 3 adjacent to the third resistor R3. In the present example, the semiconductor substrate 2 functions as a diaphragm, and when pressure is applied thereto, its portions around the sides of the hollowed portion 3 deform in respective directions intersecting the sides. Accordingly, in the present example, the first resistor R1 and the fourth resistor R4 deform in the lateral direction (transverse direction) when the diaphragm deforms. On the other hand, the second resistor R2 and the third resistor R3 deform in the longitudinal direction when the diaphragm deforms. For a piezo-resistive portion 10 which deforms in the longitudinal direction when the diaphragm deforms and a piezo-resistive portion 10 which deforms in the lateral direction when the diaphragm deforms, their resistances vary differently when the diaphragm deforms by pressure. As a result, when the diaphragm deforms by pressure, a potential difference occurs between the first middle-potential terminal Vout1 and the second middle-potential terminal Vout2, so that the pressure can be detected. Note that each of the number of piezo-resistive portions 10 which deform in the longitudinal direction when the diaphragm deforms and the number of piezo-resistive portions 10 which deform in the lateral direction when the diaphragm deforms is required to be two or more. Accordingly, the shape of the hollowed portion 3 and the shapes and arrangement of the piezo-resistive portions 10 are not limited to the case of FIG. 2.

The semiconductor substrate 2 may be provided with pads corresponding to respective ones of the high-potential side terminal Vdd, a terminal GND at the ground potential, that is, the low-potential side terminal Vss, the first middle-potential terminal Vout1, and the second middle-potential terminal Vout2. In the present example, the pads are provided at respective corners of the semiconductor substrate 2 constituting a sensor chip. In FIG. 2, wirings to the respective terminals are schematically shown. As shown in FIG. 1, the piezo-resistive portions 10 or the shield films 20 are connected to the respective potentials by the respective wirings.

Figure 3:
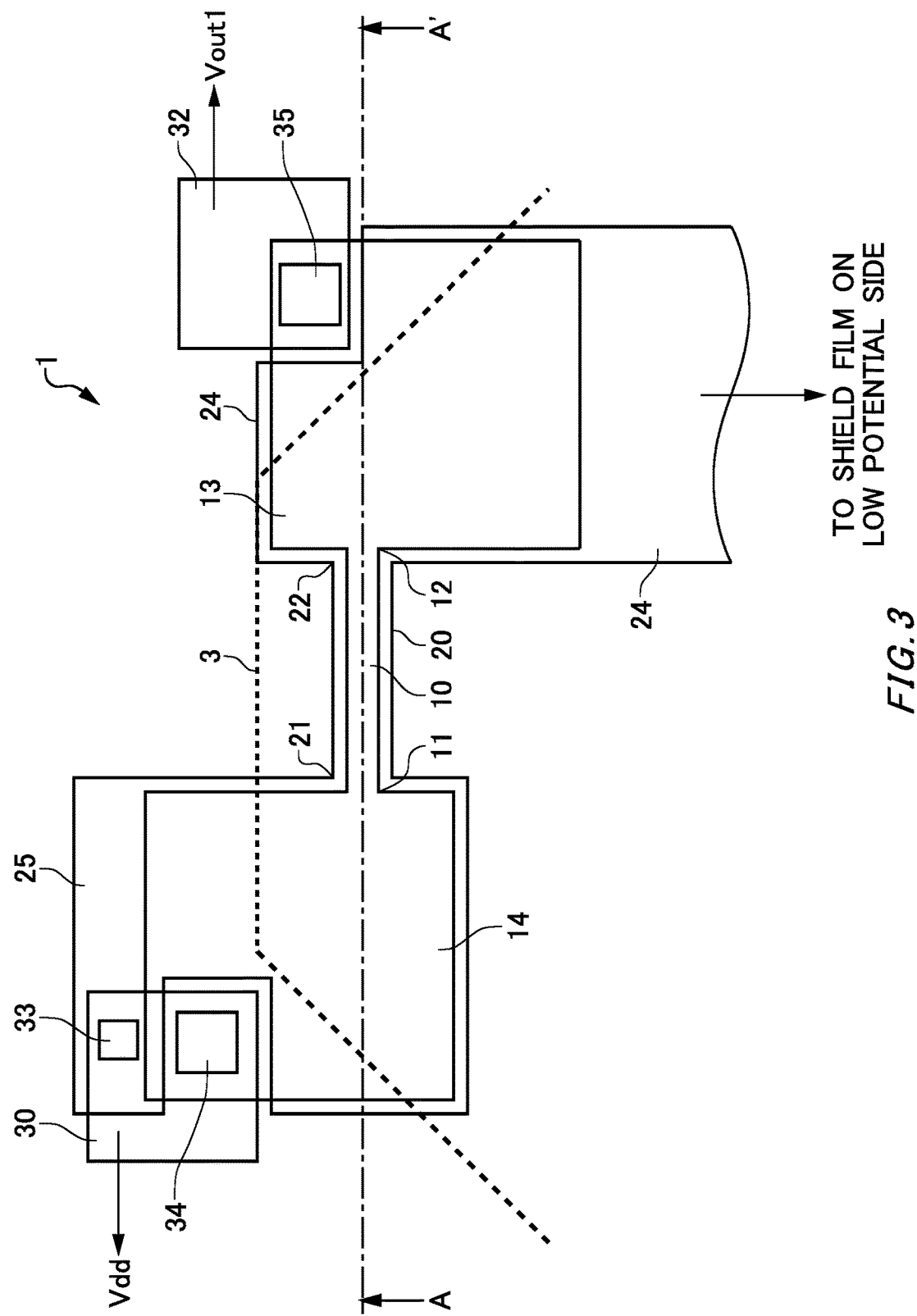
FIG. 3 is a plan view of the semiconductor pressure sensor 1 according to the first embodiment.
Figure 4:
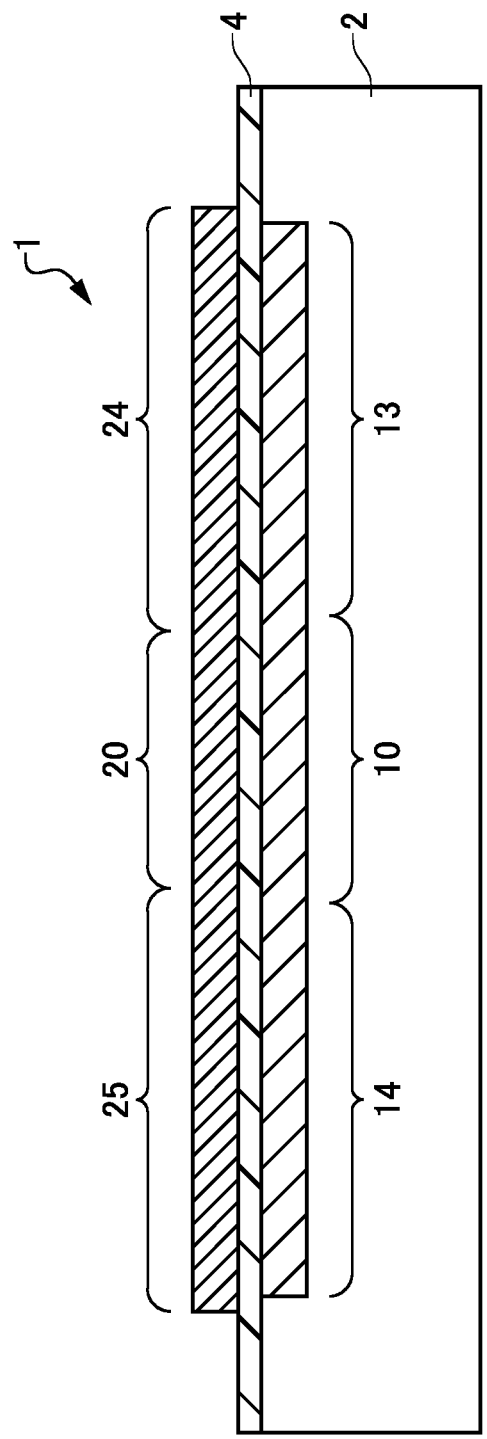
FIG. 4 is a cross-sectional view of the semiconductor pressure sensor 1 according to the first embodiment.

FIG. 3 is a plan view of the semiconductor pressure sensor 1 according to the first embodiment. FIG. 3 shows the portion of the first resistor R1 on an enlarged scale. In FIG. 3, the resistive-portion wiring 14 and the wiring portion 25 are connected to the high-potential side terminal Vdd through the metal wiring 30. The resistive-portion wiring 13 is connected to the first middle-potential terminal Vout1. The wiring portion 24 is connected to the shield film on the low-potential side. On the other hand, for each portion of the second resistor R2, the third resistor R3 and the fourth resistor R4, components to which the resistive-portion wiring and the wiring portion are connected are different from the components to which the resistive-portion wiring and the wiring portion for the first resistor R1 are connected as shown in FIG. 3. Each portion of the second resistor R2, the third resistor R3 and the fourth resistor R4 may have a similar configuration to the portion of the first resistor except for that point. FIG. 4 is a cross-sectional view of the semiconductor pressure sensor 1 according to the first embodiment. Specifically, FIG. 4 shows a cross section taken along A-A' in FIG. 3.

The semiconductor pressure sensor 1 includes a piezo-resistive portion 10, a resistive-portion wiring 13 and a resistive-portion wiring 14, as a diffused resistor in the semiconductor substrate 2. As shown in FIG. 4, the diffused resistor is formed in the surface layer of the semiconductor substrate 2. As shown in FIG. 3, one end 11 of the piezo-resistive portion 10 that is on the high-potential side in the longitudinal direction is connected to the resistive-portion wiring 14, and the other end 12 of the piezo-resistive portion 10 that is on the low-potential side in the longitudinal direction is connected to the resistive-portion wiring 13. The diffused resistor may be formed by selectively doping p-type dopants into the semiconductor substrate and also performing a thermal diffusion, so that it is of (P+)-type, for example.

The cross-sectional area of each of the resistive-portion wiring 13 and the resistive-portion wiring 14 is larger than the cross-sectional area of the piezo-resistive portion 10. Cross-sectional area may refer to the cross-sectional area in the direction perpendicular to the direction in which current flows. In the present example, as shown in FIG. 4, the piezo-resistive portion 10, the resistive-portion wiring 13 and the resistive-portion wiring 14 have the same depth from the front surface to the back surface of the semiconductor substrate 2. Accordingly, as shown in FIG. 3, the widths of the resistive-portion wiring 13 and the resistive-portion wiring 14 are larger than the width of the piezo-resistive portion 10. Width may refer to the width in the direction orthogonal to the direction in which current flows in a plane parallel to the front surface of the semiconductor substrate 2.

Due to the difference in cross-sectional area, the electrical resistance of the resistive-portion wiring 13 and the electrical resistance of the resistive-portion wiring 14 are lower than the electrical resistance of the piezo-resistive portion 10. The voltage drop in the resistive-portion wiring 13 and the voltage drop in the resistive-portion wiring 14 are smaller than the voltage drop in the piezo-resistive portion 10. Accordingly, the semiconductor pressure sensor 1 in the present example allows an easy detection of variation in the electrical resistance of the piezo-resistive portion 10. In the present example, the piezo-resistive portion 10, the resistive-portion wiring 13 and the resistive-portion wiring 14 have the same doping concentration. Note that the doping concentration of the resistive-portion wiring 13 and the doping concentration of the resistive-portion wiring 14 may be higher than the doping concentration of the piezo-resistive portion 10.

The semiconductor pressure sensor 1 includes an insulating film 4 above the piezo-resistive portion 10. In the present example, the insulating film 4 is provided in contact with the piezo-resistive portion 10. The insulating film 4 may be an oxide film of silicon dioxide ($SiO_2$) or the like, or may be a nitride film or an oxide nitride film. The insulating film 4 covers the piezo-resistive portion 10. The insulating film 4 may cover the resistive-portion wiring 13 and the resistive-portion wiring 14.

The semiconductor pressure sensor 1 has a conductive shield film 20 provided above the piezo-resistive portion 10 with the insulating film 4 intervening therebetween. The shield film 20 corresponds to the piezo-resistive portion 10. Specifically, the shape of the shield film 20 may be determined according to the shape of the piezo-resistive portion 10. The longitudinal direction of the piezo-resistive portion 10 and the longitudinal direction of the shield film 20 may be the same. The width of the shield film 20 may be larger than the width of the piezo-resistive portion 10 such that the shield film 20 covers the piezo-resistive portion 10. In plan view, the shield film 20 may be provided to have an outline along the outline of the piezo-resistive portion 10.

The semiconductor pressure sensor 1 includes a wiring portion 24 and a wiring portion 25 at both ends of the shield film 20. According to the first resistor R1 shown in the present example, one end 21 of the shield film 20 on the high-potential side is connected to the wiring portion 25. The other end 22 of the shield film 20 on the low-potential side is connected to the wiring portion 24. The wiring portion 24 and the wiring portion 25 have lower resistance values than the resistance value of the shield film 20.

The shield film 20, the wiring portion 24 and the wiring portion 25 may be formed of a polysilicon material that is continuous with each other. In the present example, the shield film 20, the wiring portion 24 and the wiring portion 25 may have the same doping concentration. In the present example, the cross-sectional area of each of the wiring portion 24 and the wiring portion 25 is larger than the cross-sectional area of the shield film 20. Cross-sectional area may refer to the cross-sectional area in the direction perpendicular to the direction in which current flows. In the present example, as shown in FIG. 4, the shield film 20, the wiring portion 24 and the wiring portion 25 have the same thickness in the direction perpendicular to the front surface of the semiconductor substrate 2. Accordingly, as shown in FIG. 3, the width of the wiring portion 24 and the width of the wiring portion 25 are larger than the width of the shield film 20. Width may refer to the width in the direction orthogonal to the direction in which current flows in a plane parallel to the front surface of the semiconductor substrate 2.

Due to the difference in cross-sectional area, the electrical resistances of the portions of the wiring portion 24 and the wiring portion 25 are lower than the electrical resistance of the shield film 20. The voltage drops in the portions of the wiring portion 24 and the wiring portion 25 are smaller than the voltage drop in the shield film 20. Accordingly, the semiconductor pressure sensor 1 in the present example allows voltage drop to occur mainly at the portion of the shield film 20, so that a potential gradient, that is, a potential difference can be generated in the shield film 20.

The wiring portion 25 and the resistive-portion wiring 14 may be electrically connected to the metal wiring 30. In the present example, the wiring portion 25 is electrically connected the metal wiring 30 via a contact portion 33. The resistive-portion wiring 14 is electrically connected to the metal wiring 30 via a contact portion 34. The contact portion 34 may be formed by filling an opening provided in the insulating film 4 with metal such as aluminum. The metal wiring 30 is connected to the high-potential side terminal Vdd of the Wheatstone bridge circuit.

The resistive-portion wiring 13 is electrically connected to the metal wiring 32. In the present example, the resistive-portion wiring 13 is electrically connected to the metal wiring 32 via a contact portion 35. The metal wiring 32 is connected to the first middle-potential terminal Vout1 of the Wheatstone bridge circuit. The other end of the wiring portion 24 may extend to a shield film on the low-potential side (the second shield film 20-2 in the present example). In FIG. 3, the position of the hollowed portion 3 is indicated by dotted line. Also, the resistive-portion wirings 13 and 14 are indicated by solid line. The metal wiring 30 and the metal wiring 32 may not be provided on the diaphragm, that is, the semiconductor substrate 2 above the hollowed portion 3, and may be provided on the semiconductor substrate 2 at a region outside the diaphragm. In this manner, it is possible to prevent the metal wiring 30 and the metal wiring 32 from inhibiting movement of the diaphragm.

As shown in FIG. 3, the wiring portion 24 corresponds to the resistive-portion wiring 13, and the wiring portion 25 corresponds to the resistive-portion wiring 14. Specifically, the shape and size of the wiring portion 24 may be determined such that the wiring portion 24 covers the resistive-portion wiring 13 except for the region in which the contact portion 35 is provided. Similarly, the shape and size of the wiring portion 25 may be determined such that the wiring portion 25 covers the resistive-portion wiring 14 except for the region in which the contact portion 34 is provided.

The wiring portion 24 has a first width in the longitudinal direction of the piezo-resistive portion 10 and a second width in the direction perpendicular to the longitudinal direction in a plane parallel to the front surface of the semiconductor substrate 2. The first width and the second width may each be larger than the width of the resistive-portion wiring 13. Similarly, the wiring portion 25 may have a first width and a second width that are each larger than the width of the resistive-portion wiring 14. The position of the wiring portion 24 may be determined such that at least part of the outline of the wiring portion 24 is along the outline of the resistive-portion wiring 13.

As described above, in the present example, a potential difference is generated in the piezo-resistive portion 10 such that one end 11 is at a higher potential than the other end 12. On the other hand, a potential difference is also generated in the shield film 20 provided above the piezo-resistive portion 10 such that one end 21 positioned closer to one end 11 of the piezo-resistive portion 10 is at a higher potential than the other end 22 positioned closer to the other end 12 of the piezo-resistive portion 10. Accordingly, a potential difference is generated in the shield film 20 in the same direction as the potential difference generated in the piezo-resistive portion 10.

The shield film 20 may be a resistive film. The sheet resistance value of the shield film 20 may be 10 Ω/square or more and 10 kΩ/square or less, and more preferably 1 kΩ/square or more and 10 kΩ/square or less. If the sheet resistance value of the shield film 20 is excessively low, consumption current in the shield film 20 increases. Also, it is needed to increase the thickness of the polysilicon material in order to reduce the sheet resistance. Accordingly, the shield film 20 having a sheet resistance value of 10 Ω/square or more allows consumption current to be reduced and the thickness of the polysilicon material to be decreased. On the other hand, if the sheet resistance value of the shield film 20 is 10 kΩ/square or less, the long-term reliability of the doped polysilicon material can be enhanced.

According to the present example, the shield film 20 has a higher potential above a position where the piezo-resistive portion 10 has a higher potential, and the shield film 20 has a lower potential above a position where the piezo-resistive portion 10 has a lower potential. In this manner, the direction of the potential gradient in the piezo-resistive portion 10 and the direction of the potential gradient in the shield film 20 are the same. According to the present example, the potential distribution in the piezo-resistive portion 10 and the potential distribution in the shield film 20 can be made consistent with each other.

According to the semiconductor pressure sensor 1 in the present example, the potential difference between the shield film 20 and the piezo-resistive portion 10 can be reduced compared to the case where the shield film 20 is fixed at a constant potential. Accordingly, it is possible to reduce variation in the resistance value or temperature characteristics due to the potential difference between the shield film 20 and the piezo-resistive portion 10 varying with position on the shield film 20.

In the present example, by making the cross-sectional area (width in particular) of each of the wiring portion 24 and the wiring portion 25 larger than the cross-sectional area of the shield film 20 such that the doping concentration of the shield film 20 and each of the doping concentration of the wiring portion 24 and the doping concentration of the wiring portion 25 are not different from each other, the electrical resistance value of each of the wiring portion 24 and the wiring portion 25 can be made smaller than the electrical resistance value of the shield film 20. Accordingly, it is not needed to perform an additional process to make the doping concentration of the shield film 20 and each of the doping concentration of the wiring portion 24 and the doping concentration of the wiring portion 25 different from each other. A potential gradient can be generated mainly in the shield film 20 positioned above the piezo-resistive portion 10, and therefore it is possible to align the region of the piezo-resistive portion 10 where voltage drop occurs and the region of the shield film 20 where voltage drop occurs. Also, the direction of the potential difference generated in the piezo-resistive portion 10 and the direction of the potential difference generated in the shield film 20 can be matched. Accordingly, the potential distribution generated in the piezo-resistive portion 10 and the potential distribution generated in the shield film 20 can be made consistent with each other.

Figure 5:
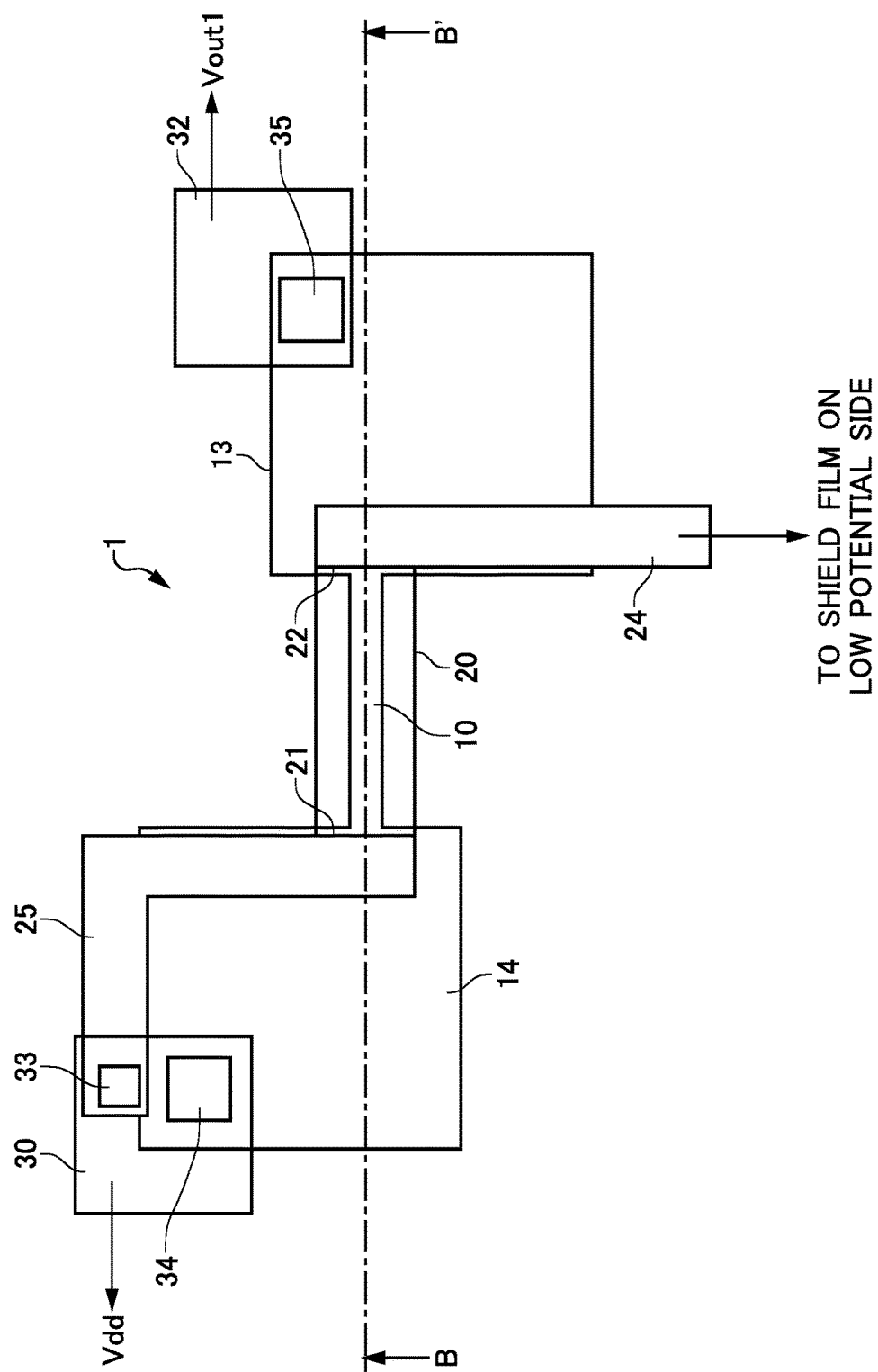
FIG. 5 is a plan view of the semiconductor pressure sensor 1 according to a second embodiment.
Figure 6:
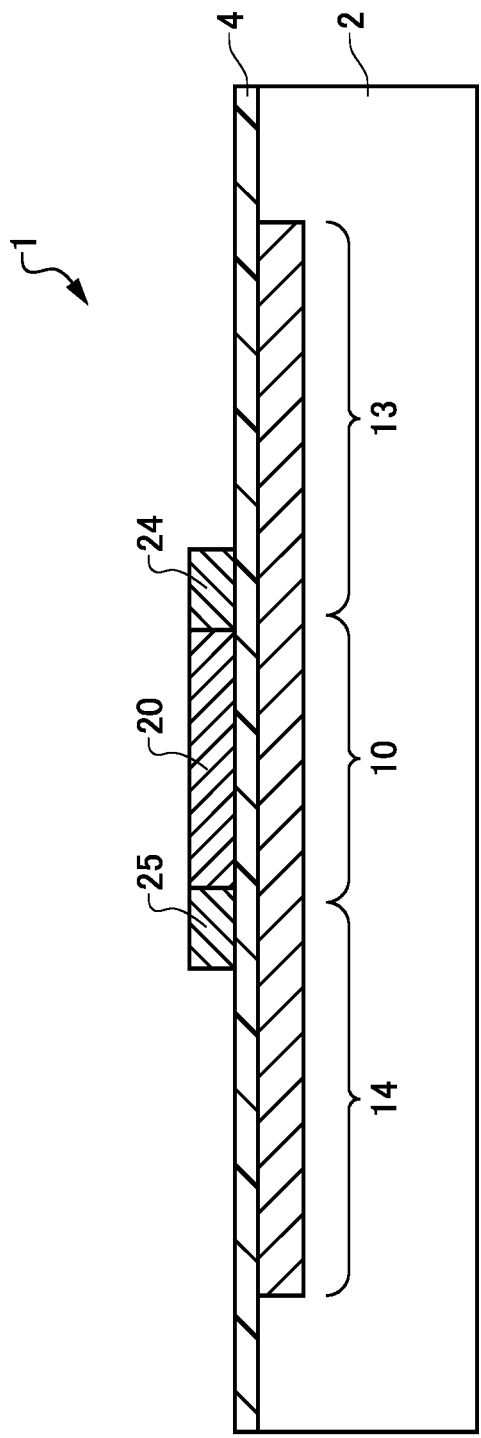
FIG. 6 is a cross-sectional view of the semiconductor pressure sensor 1 according to the second embodiment.

FIG. 5 is a plan view of the semiconductor pressure sensor 1 according to a second embodiment. FIG. 5 shows the portion of the first resistor R1 on an enlarged scale. Each portion of the second resistor R2, the third resistor R3 and the fourth resistor R4 has a substantially similar configuration to the configuration shown in FIG. 5. Note that, in a similar manner to FIG. 3, for each portion of the second resistor R2, the third resistor R3 and the fourth resistor R4, components to which the resistive-portion wiring and the wiring portion are connected are different from the components to which the resistive-portion wiring and the wiring portion for the portion of the first resistor R1 are connected. FIG. 6 is a cross-sectional view of the semiconductor pressure sensor 1 according to the second embodiment. Specifically, FIG. 6 shows a cross section taken along B-B' in FIG. 5.

In the first embodiment described above, a case has been illustrated where the resistance values of the wiring portion 24 and the wiring portion 25 are made lower than the resistance value of the shield film 20 by making the cross-sectional area of each of the wiring portion 24 and the wiring portion 25 larger than the cross-sectional area of the shield film 20. On the other hand, for the semiconductor pressure sensor 1 in the present example, a case is described where the resistance value of the wiring portion 24 and the resistance value of the wiring portion 25 are made lower than the resistance value of the shield film 20 by making the doping concentration of the wiring portion 24 and the doping concentration of the wiring portion 25 higher than the doping concentration of the shield film. Other configurations are similar to those in the first embodiment, and overlapping descriptions will not be repeated.

The semiconductor pressure sensor 1 in the present example also includes a piezo-resistive portion 10, a resistive-portion wiring 13 and a resistive-portion wiring 14, as a diffused resistor in the semiconductor substrate 2. The semiconductor pressure sensor 1 has a conductive shield film 20 provided above the piezo-resistive portion 10 with the insulating film 4 intervening therebetween. The semiconductor pressure sensor 1 includes a wiring portion 24 and a wiring portion 25 at both ends of the shield film 20. In the present example, the shield film 20, the wiring portion 24 and the wiring portion 25 may be formed of a polysilicon material that is continuous with each other.

The cross-sectional areas of the wiring portion 24 and the wiring portion 25 in the direction perpendicular to the direction in which current flows may not be larger than the cross-sectional area of the shield film 20 in the direction perpendicular to the direction in which current flows. In the present example, the cross-sectional area of each of the wiring portion 24 and the wiring portion 25 is smaller than the cross-sectional area of the shield film 20. The doping concentration of the wiring portion 24 and the doping concentration of the wiring portion 25 are higher than the doping concentration of the shield film.

Due to the difference in doping concentration, the electrical resistances of the portions of the wiring portion 24 and the wiring portion 25 are lower than the electrical resistance of the shield film 20. The voltage drops in the portions of the wiring portion 24 and the wiring portion 25 are smaller than the voltage drop in the shield film 20. Accordingly, the semiconductor pressure sensor 1 in the present example allows voltage drop to occur mainly at the portion of the shield film 20, so that a potential gradient, that is, a potential difference can be generated in the shield film 20.

In the present example as well, the potential difference between the shield film 20 and the piezo-resistive portion 10 can be reduced compared to the case where the shield film 20 is fixed at a constant potential. Accordingly, it is possible to reduce variation in the resistance value or temperature characteristics due to the potential difference between the shield film 20 and the piezo-resistive portion 10 varying with position on the shield film 20. Also, in the present example, the semiconductor pressure sensor 1 includes a piezo-resistive portion 10, a resistive-portion wiring 13 and a resistive-portion wiring 14, as a diffused resistor. Also, the semiconductor pressure sensor 1 includes a shield film 20, a wiring portion 24 and a wiring portion 25, as a polysilicon material that is continuous with each other. In the semiconductor pressure sensor 1 of the present example, the area of the polysilicon material is smaller than the area of the diffused resistor in plan view, as shown in FIG. 5. Specifically, the total area of the shield film 20, the wiring portion 24 and the wiring portion 25 is smaller than the total area of the piezo-resistive portion 10, the resistive-portion wiring 13 and the resistive-portion wiring 14. Such a configuration can mitigate the degree at which the stacked polysilicon material prevents pressure-dependent deformation of the diaphragm.

Figure 7:
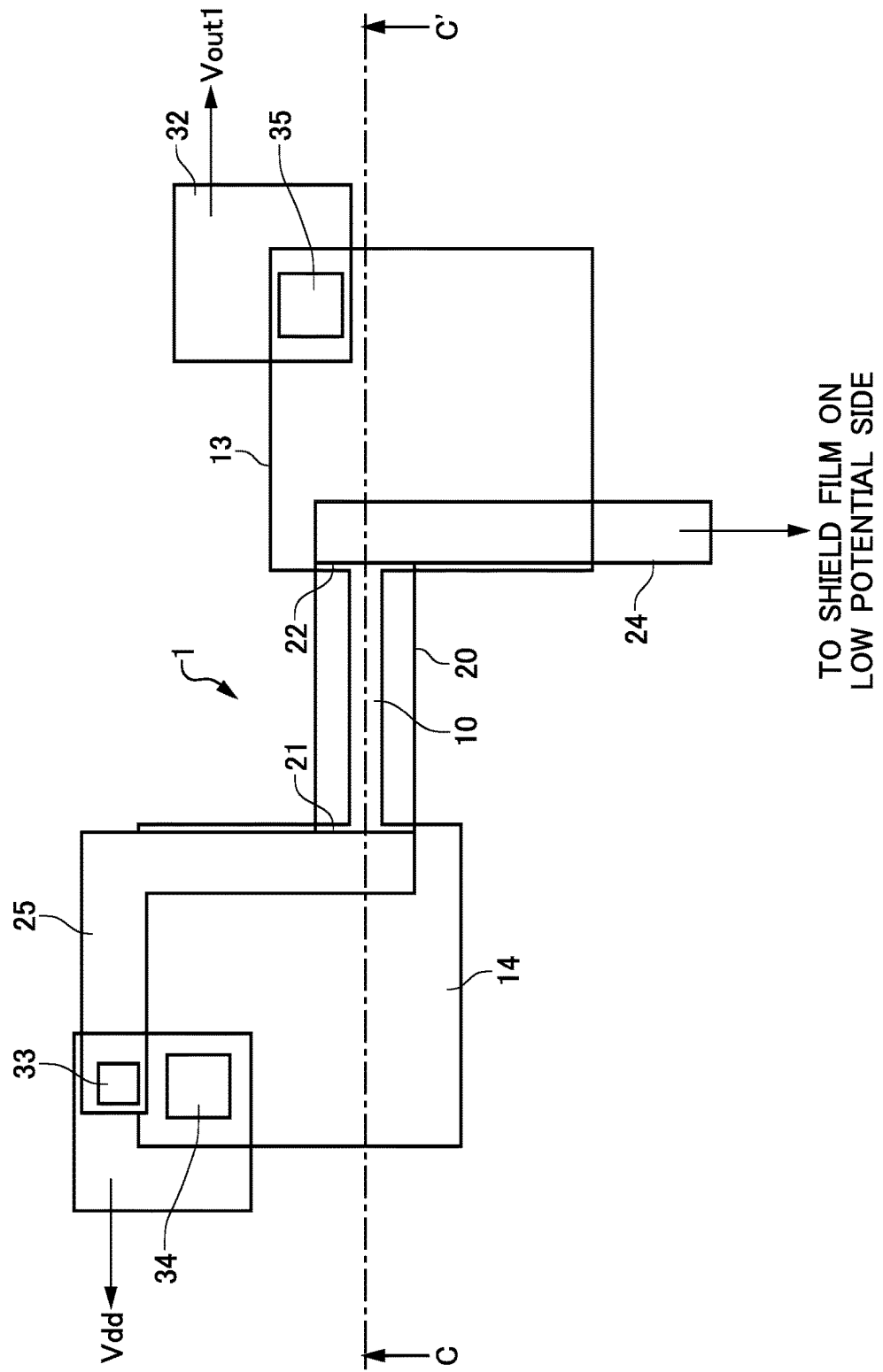
FIG. 7 is a plan view of the semiconductor pressure sensor 1 according to a third embodiment.
Figure 8:
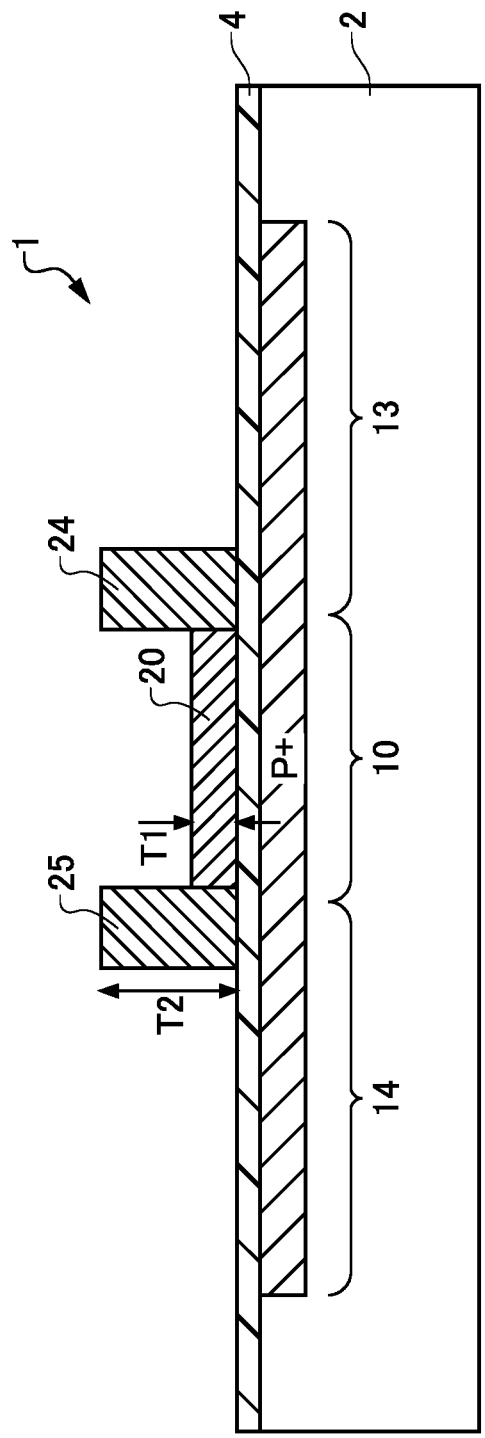
FIG. 8 is a cross-sectional view of the semiconductor pressure sensor 1 according to the third embodiment.

FIG. 7 is a plan view of the semiconductor pressure sensor 1 according to a third embodiment. FIG. 7 shows the portion of the first resistor R1 on an enlarged scale. In enlarged views of the portions of the second resistor R2, the third resistor R3 and the fourth resistor R4, they have substantially similar configurations. Note that, in the enlarged views of the portions of the second resistor R2, the third resistor R3 and the fourth resistor R4, they are respectively connected to different components, in a similar manner to FIG. 3. FIG. 8 is a cross-sectional view of the semiconductor pressure sensor 1 according to the third embodiment. Specifically, FIG. 8 shows a cross section taken along C-C' in FIG. 7.

In the first and second embodiments described above, a case has been illustrated where the shield film 20 has the same thickness as the wiring portion 24 and the wiring portion 25. On the other hand, in the semiconductor pressure sensor 1 of the present example, a polysilicon portion constituting the shield film 20 has a smaller thickness than polysilicon portions constituting the wiring portion 24 and the wiring portion 25. The structure of the present example may be realized by depositing a larger amount of polysilicon in the portions of the wiring portion 24 and the wiring portion 25 than in the portion of the shield film 20. For example, the structure of the present example may be realized by using: a first deposition step of uniformly depositing polysilicon in the entire region of the shield film 20 and the wiring portion 24 and the wiring portion 25; and a second deposition step of depositing polysilicon only in the wiring portion 24 and the wiring portion 25 while covering the portion of the shield film 20 with a mask.

In the example shown in FIG. 8, the thickness of the polysilicon portion constituting the shield film 20 is T1, and the thickness of the polysilicon portions constituting the wiring portion 24 and the wiring portion 25 is T2. T2 may be 1.5 times or more T1, may be 2 times or more T1, or may be 3 times or more T1. By forming the polysilicon portion constituting the shield film 20 to have a smaller thickness than the polysilicon portions constituting the wiring portion 24 and the wiring portion 25, the cross-sectional area of the wiring portion 24 and the wiring portion 25 is made larger than the cross-sectional area of the shield film 20. Accordingly, the resistance values of the wiring portion 24 and the wiring portion 25 can be made lower than the resistance values of the shield film 20. In the present example, the doping concentration of the shield film 20 may be the same as the doping concentrations of the wiring portion 24 and the wiring portion 25. Note that the doping concentrations of the wiring portion 24 and the wiring portion 25 may be higher than the doping concentration of the shield film.

Due to the difference in thickness of polysilicon, the electrical resistances of the portions of the wiring portion 24 and the wiring portion 25 are lower than the electrical resistance of the shield film 20. The voltage drops in the portions of the wiring portion 24 and the wiring portion 25 are smaller than the voltage drop in the shield film 20. Accordingly, the semiconductor pressure sensor 1 in the present example allows voltage drop to occur mainly at the portion of the shield film 20, so that a potential gradient, that is, a potential difference can be generated in the shield film 20.

In the present example as well, the potential difference between the shield film 20 and the piezo-resistive portion 10 can be reduced compared to the case where the shield film 20 is fixed at a constant potential. Accordingly, it is possible to reduce variation in the resistance value or temperature characteristics due to the potential difference between the shield film 20 and the piezo-resistive portion 10 varying with position on the shield film 20. Also, in the present example as well, the area of the polysilicon material is smaller than the area of the diffused resistor in plan view. Specifically, the total area of the shield film 20, the wiring portion 24 and the wiring portion 25 may be smaller than the total area of the piezo-resistive portion 10, the resistive-portion wiring 13 and the resistive-portion wiring 14.

Figure 9:
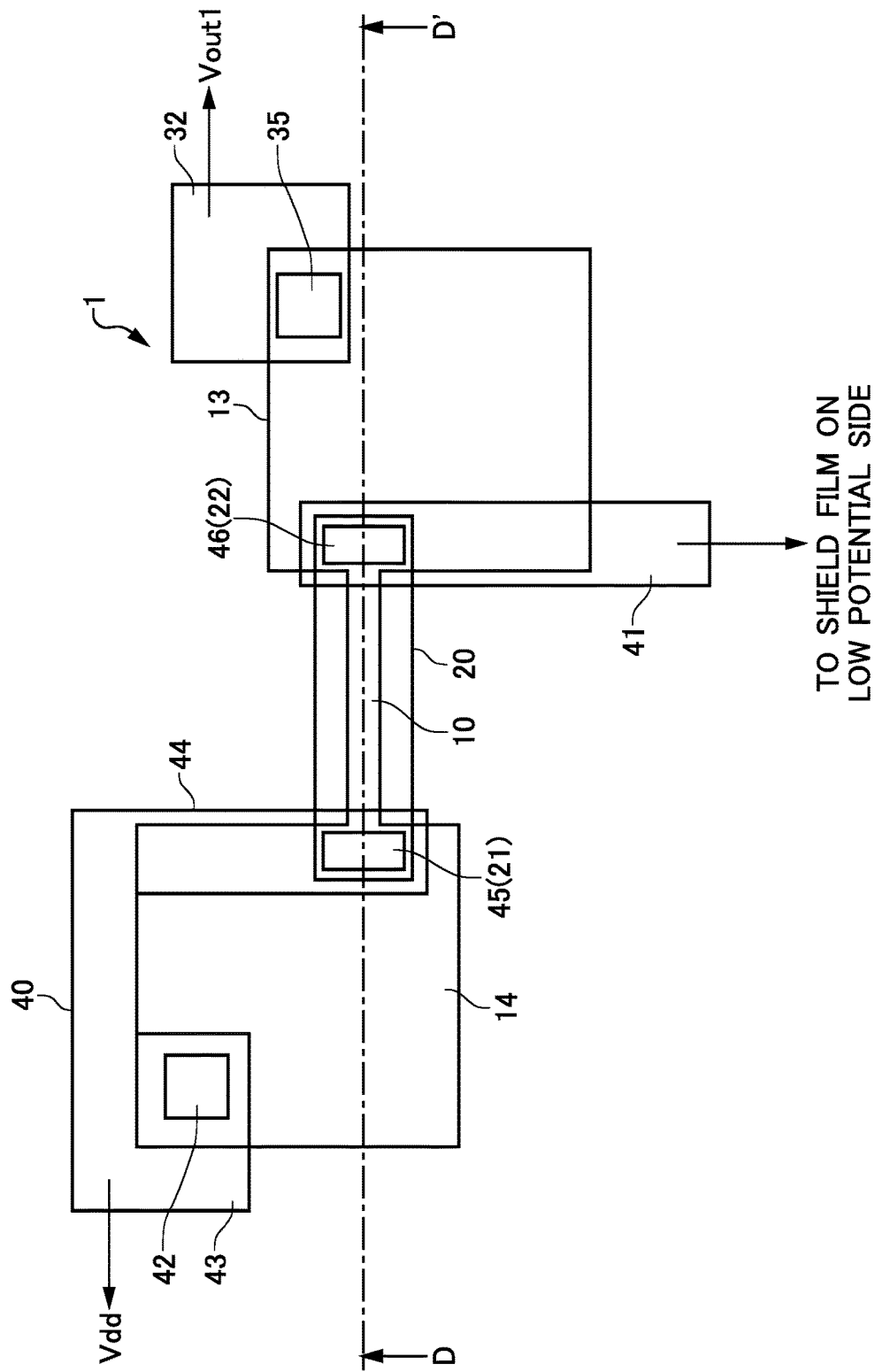
FIG. 9 is a plan view of the semiconductor pressure sensor 1 according to a fourth embodiment.
Figure 10:
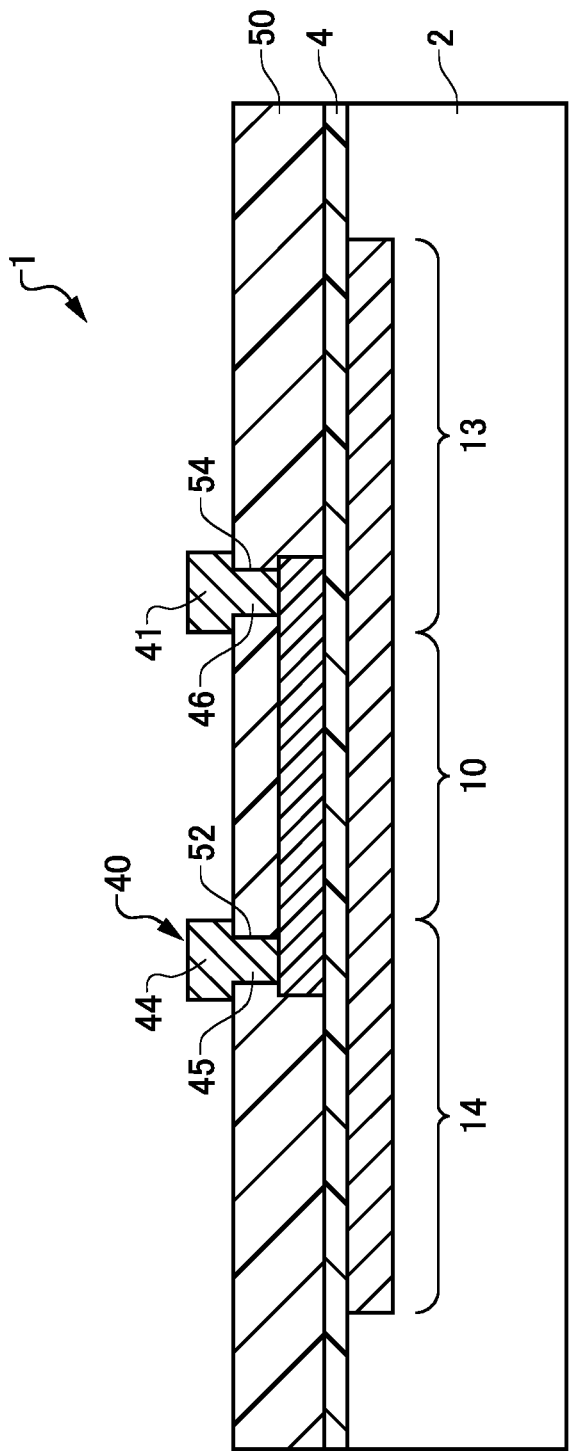
FIG. 10 is a cross-sectional view of the semiconductor pressure sensor 1 according to the fourth embodiment.

FIG. 9 is a plan view of the semiconductor pressure sensor 1 according to a fourth embodiment. FIG. 9 shows the portion of the first resistor R1 on an enlarged scale. Each portion of the second resistor R2, the third resistor R3 and the fourth resistor R4 has a substantially similar configuration to the configuration shown in FIG. 9. Note that, in a similar manner to FIG. 3, for each portion of the second resistor R2, the third resistor R3 and the fourth resistor R4, components to which the resistive-portion wiring and the wiring portion are connected are different from the components to which the resistive-portion wiring and the wiring portion for the portion of the first resistor R1 are connected. FIG. 10 is a cross-sectional view of the semiconductor pressure sensor 1 according to the fourth embodiment. Specifically, FIG. 10 shows a cross section taken along D-D' in FIG. 9.

In the first to third embodiments described above, a case has been illustrated where the shield film 20 and the wiring portion 24 and the wiring portion 25 are formed of a polysilicon material that is continuous with each other. The semiconductor substrate 2 above the hollowed portion 3 functions as a diaphragm, and therefore it is desirable to use a polysilicon material or the like having the same thermal expansion coefficient or the like as the semiconductor substrate 2. However, the wiring portion 24 and the wiring portion 25 may be formed of a different material from that of the shield film 20. The present example describes a case where a wiring portion 40 and a wiring portion 41 are formed of a metal material such as aluminum. Other configurations are similar to those in the first to third embodiments, and overlapping descriptions will not be repeated.

A piezo-resistive portion 10, a resistive-portion wiring 13 and a resistive-portion wiring 14 are included as a diffused resistor in the semiconductor substrate 2. The configuration of the diffused resistor is similar to that in the cases of the first to third embodiments. The semiconductor pressure sensor 1 has a conductive shield film 20 provided above the piezo-resistive portion 10 with the insulating film 4 intervening therebetween. One end 21 of the shield film 20 on the high-potential side is connected to a wiring portion 40 via a contact portion 45. The other end 22 of the shield film 20 on the low-potential side is connected to a wiring portion 41 via a contact portion 46.

The wiring portion 40 and the wiring portion 41 may be formed of metal such as aluminum or copper. In the wiring portion 40, a contact wiring portion 43 and a shield-film wiring portion 44 may be integrally formed with metal. The contact wiring portion 43 is electrically connected to the resistive-portion wiring 14 via a contact portion 42. The contact wiring portion 43 may be extended to be connected to the high-potential side terminal Vdd. The shield-film wiring portion 44 is connected to one end 21 of the shield film 20 on the high-potential side via the contact portion 45. The wiring portion 41 is electrically connected to the resistive-portion wiring 13 via the contact portion 46. The other end of the wiring portion 41 may extend to a shield film on the low-potential side (the second shield film 20-2 in the present example).

The wiring portion 40 and the wiring portion 41 are formed of metal such as aluminum or copper having a lower resistivity than polysilicon. Also, the electrical resistances of the wiring portion 40 and the wiring portion 41 may be lower than the electrical resistance of the shield film 20 formed of polysilicon. The voltage drops in the portions of the wiring portion 40 and the wiring portion 41 are smaller than the voltage drop in the shield film 20. Accordingly, the semiconductor pressure sensor 1 in the present example allows voltage drop to occur mainly at the portion of the shield film 20, so that a potential gradient, that is, a potential difference can be generated in the shield film 20.

In the present example as well, the potential difference between the shield film 20 and the piezo-resistive portion 10 can be reduced compared to the case where the shield film 20 is fixed at a constant potential. Accordingly, it is possible to reduce variation in the resistance value or temperature characteristics due to the potential difference between the shield film 20 and the piezo-resistive portion 10 varying with position on the shield film 20.

Figure 11:
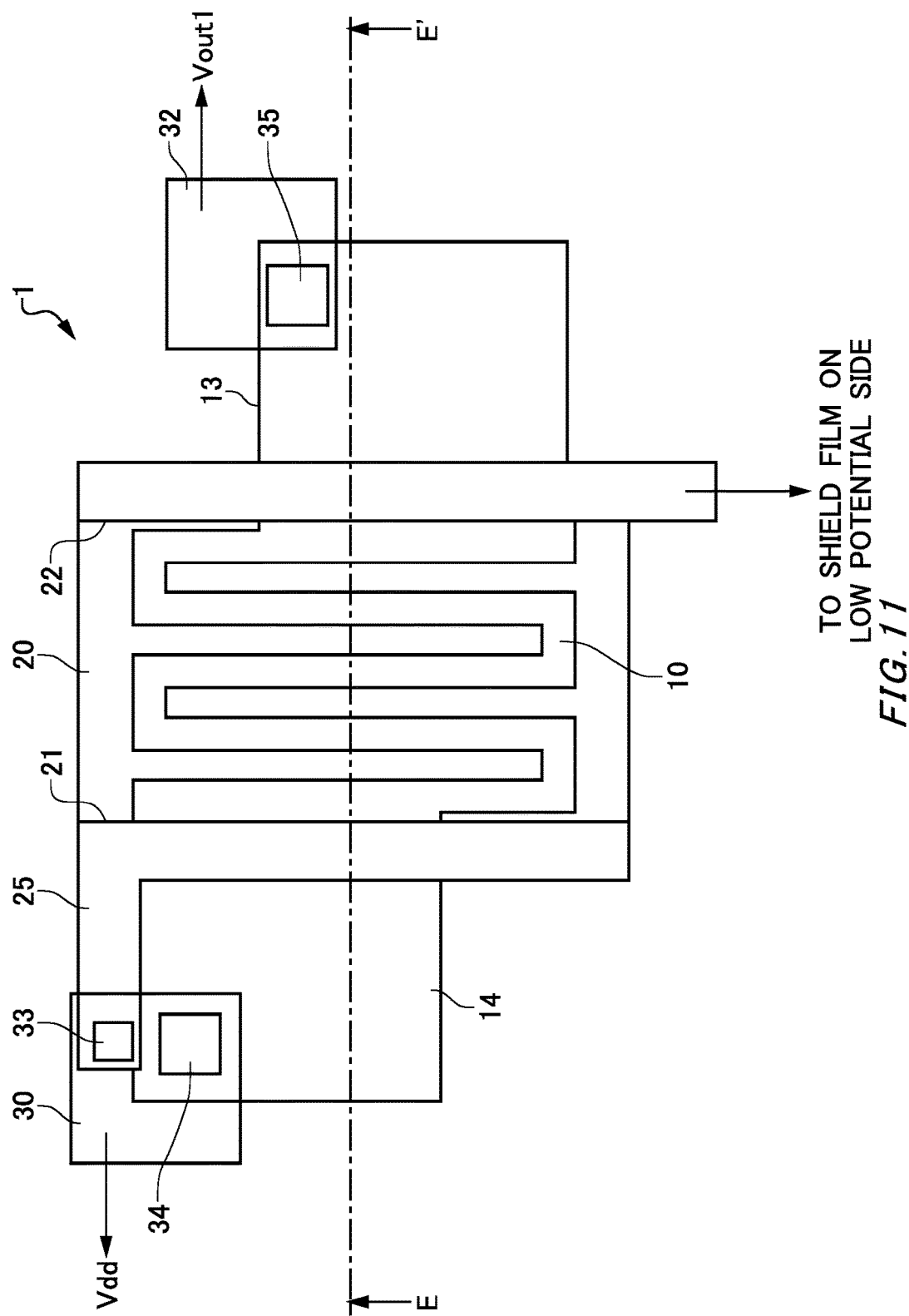
FIG. 11 is a plan view of the semiconductor pressure sensor 1 according to a fifth embodiment.
Figure 12:
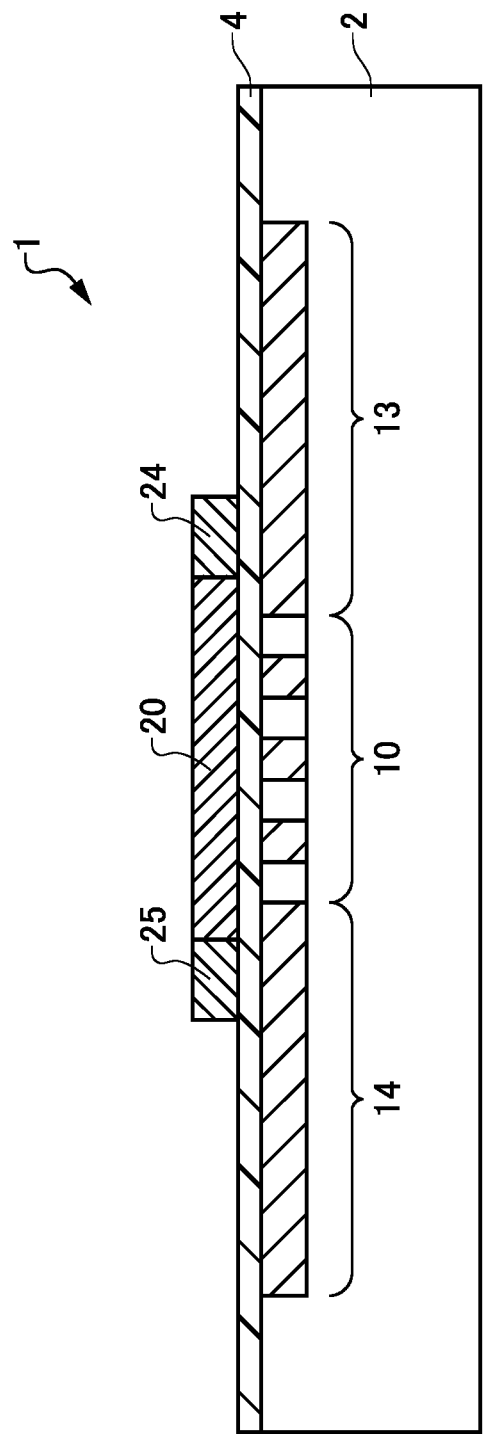
FIG. 12 is a cross-sectional view of the semiconductor pressure sensor 1 according to the fifth embodiment.

FIG. 11 is a plan view of the semiconductor pressure sensor 1 according to the fifth embodiment. FIG. 11 shows the portion of the first resistor R1 on an enlarged scale. Each portion of the second resistor R2, the third resistor R3 and the fourth resistor R4 has a substantially similar configuration to the configuration shown in FIG. 11. Note that, in a similar manner to FIG. 3, for each portion of the second resistor R2, the third resistor R3 and the fourth resistor R4, components to which the resistive-portion wiring and the wiring portion are connected are different from the components to which the resistive-portion wiring and the wiring portion for the portion of the first resistor R1 are connected. FIG. 12 is a cross-sectional view of the semiconductor pressure sensor 1 according to the fifth embodiment. Specifically, FIG. 12 shows a cross section taken along E-E' in FIG. 11.

In the first to fourth embodiments described above, the shield film 20 is provided to have an outline along the outline of the piezo-resistive portion 10 in plan view. However, in a case where the piezo-resistive portion 10 is partitioned to have a complex shape, the shield film 20 may not necessarily be provided to have an outline along the outline of the piezo-resistive portion 10. Two different parts of one shield film 20 may be connected to different potentials such that the potential difference between the piezo-resistive portion 10 and the shield film 20 is reduced. In the present example, the shield film 20 is not provided to have an outline along the outline of the piezo-resistive portion 10. Specifically, in view of enhancing the sensitivity of the sensor, the piezo-resistive portion 10 is wound in a meandering shape.

In the present example, one shield film 20 covers the entire piezo-resistive portion 10 having a meandering shape. The semiconductor pressure sensor 1 includes a wiring portion 24 and a wiring portion 25 at both ends of the shield film 20. In the present example, one side of the shield film 20 may be connected to the wiring portion 24 in its entirety, and another side of the shield film 20 opposite to the one side may be connected to the wiring portion 25 in its entirety.

The potential distribution in the piezo-resistive portion 10 that is wound in a meandering shape and the potential distribution in the shield film 20 having a plate-shape are not completely consistent with each other. However, broadly speaking, the piezo-resistive portion 10 has a higher potential at the side connected to the resistive-portion wiring 14 and has a lower potential at the side connected to the resistive-portion wiring 13.

Accordingly, by connecting one end 21 of the plate-shaped shield film 20 closer to the resistive-portion wiring 14 to a higher potential and connecting the other end 22 closer to the resistive-portion wiring 13 to a lower potential, the potential distribution of the shield film 20 can be made closer to the potential distribution of the piezo-resistive portion 10 compared to the case where the shield film 20 is merely fixed at a constant potential.

Figure 13:
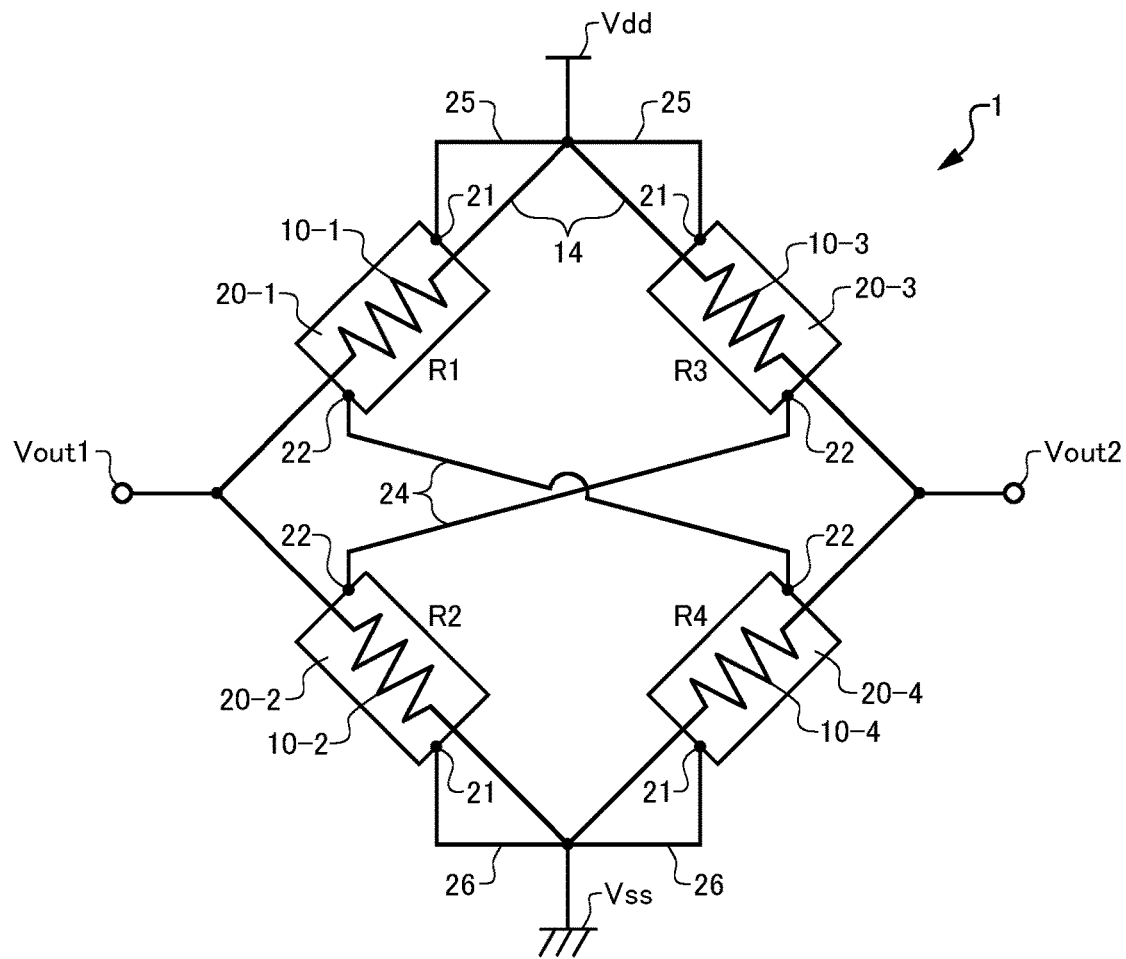
FIG. 13 shows an example of the circuit configuration of the semiconductor pressure sensor 1 according to a sixth embodiment.

FIG. 13 shows an example of the circuit configuration of the semiconductor pressure sensor 1 according to a sixth embodiment. In the present example, unlike the circuit configuration in the first embodiment described with reference to FIG. 1, the other end 22 of the first shield film 20-1 and the other end 22 of the fourth shield film 20-4 are electrically connected. Also, the other end 22 of the third shield film 20-3 and the other end 22 of the second shield film 20-2 are electrically connected. Accordingly, in the present example, two shield films, that is, the first shield film 20-1 and the fourth shield film 20-4 are connected in series between the high-potential side terminal Vdd and the low-potential side terminal Vss. Similarly, the third shield film 20-3 and the second shield film 20-2 are connected in series between the high-potential side terminal Vdd and the low-potential side terminal Vss.

In the present example, the first resistor R1 and the second resistor R2 are electrically connected in series, but the first shield film 20-1 and the second shield film 20-2 provided above them are not connected in series to each other. The third resistor R3 and the fourth resistor R4 are electrically connected in series, but the third shield film 20-3 and the fourth shield film 20-4 provided above them are not electrically connected in series to each other. The present example is different from the cases of the first to fifth embodiments in that point. Other structures are similar to those in the first to fifth embodiments, and overlapping descriptions will not be repeated. The shield film 20, wiring portion 24 and the wiring portion 25 may have similar structures to those described in the first to fifth embodiments.

In the present example as well, a potential difference is generated in the shield film 20 in the same direction as the direction of the potential difference generated in each piezo-resistive portion 10. As the potential distribution in the piezo-resistive portion 10 and the potential distribution in the shield film 20 are consistent with each other, the potential difference between the piezo-resistive portion 10 and the shield film 20 can be reduced at each point in the piezo-resistive portion 10. Accordingly, it is possible to reduce variation in the resistance value or temperature characteristics due to the potential difference between the shield film 20 and the piezo-resistive portion 10 varying with position on the shield film 20.

Figure 14:
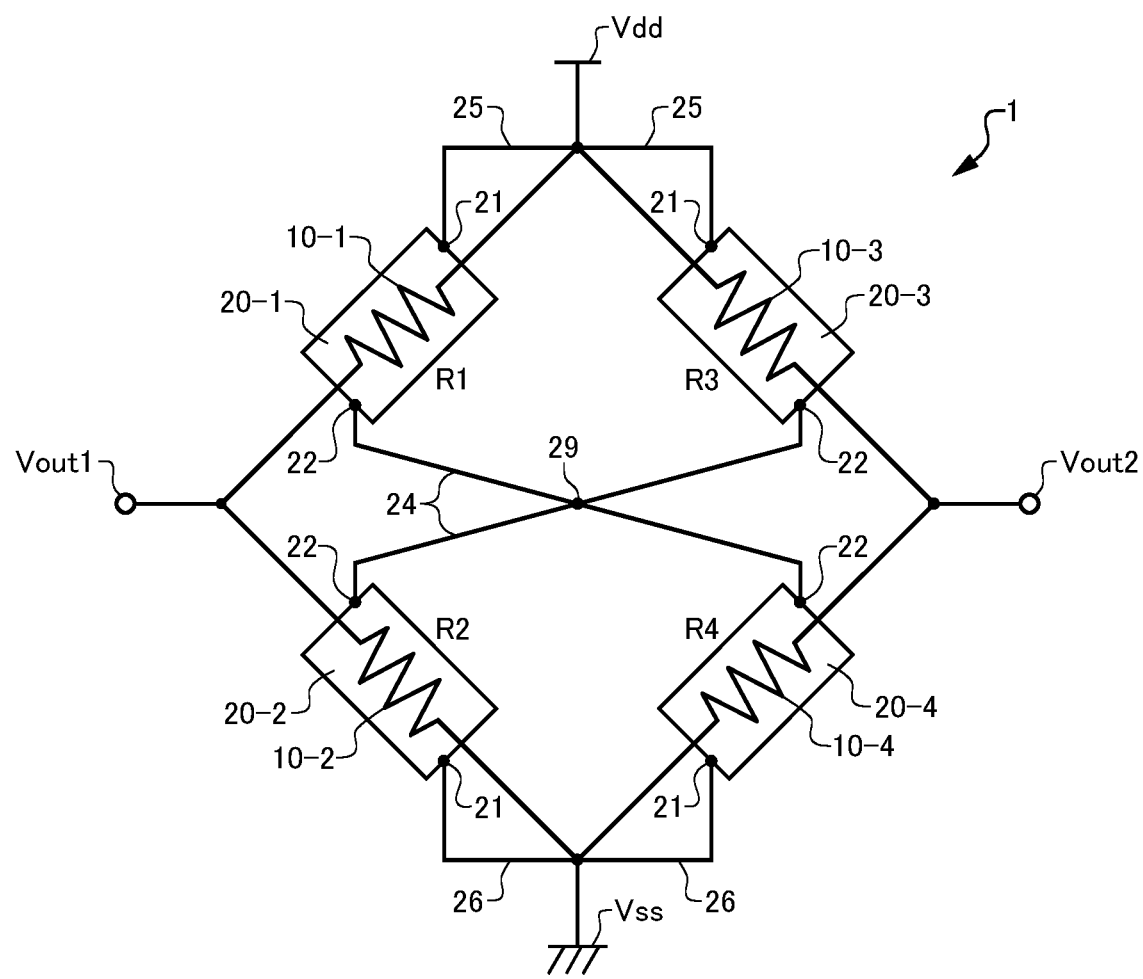
FIG. 14 shows an example of the circuit configuration of the semiconductor pressure sensor 1 according to a seventh embodiment.

FIG. 14 shows an example of the circuit configuration of the semiconductor pressure sensor 1 according to a seventh embodiment. In the present example, the other end 22 of the first shield film 20-1, the other end 22 of the second shield film 20-2, the other end 22 of the third shield film 20-3 and the other end 22 of the fourth shield film 20-4 are electrically connected to each other at a connection point 29. Other structures are similar to those in the first to fifth embodiments, and overlapping descriptions will not be repeated. The shield film 20, the wiring portion 24 and the wiring portion 25 may adopt a variety of configurations described in the first to fifth embodiments.

In the present example as well, a potential difference is generated in the shield film 20 in the same direction as the direction of the potential difference generated in each piezo-resistive portion 10. As the potential distribution in the piezo-resistive portion 10 and the potential distribution in the shield film 20 are consistent with each other, the potential difference between the piezo-resistive portion 10 and the shield film 20 can be reduced at each point in the piezo-resistive portion 10. Accordingly, it is possible to reduce variation in the resistance value or temperature characteristics due to the potential difference between the shield film 20 and the piezo-resistive portion 10 varying with position on the shield film 20.

Figure 15:
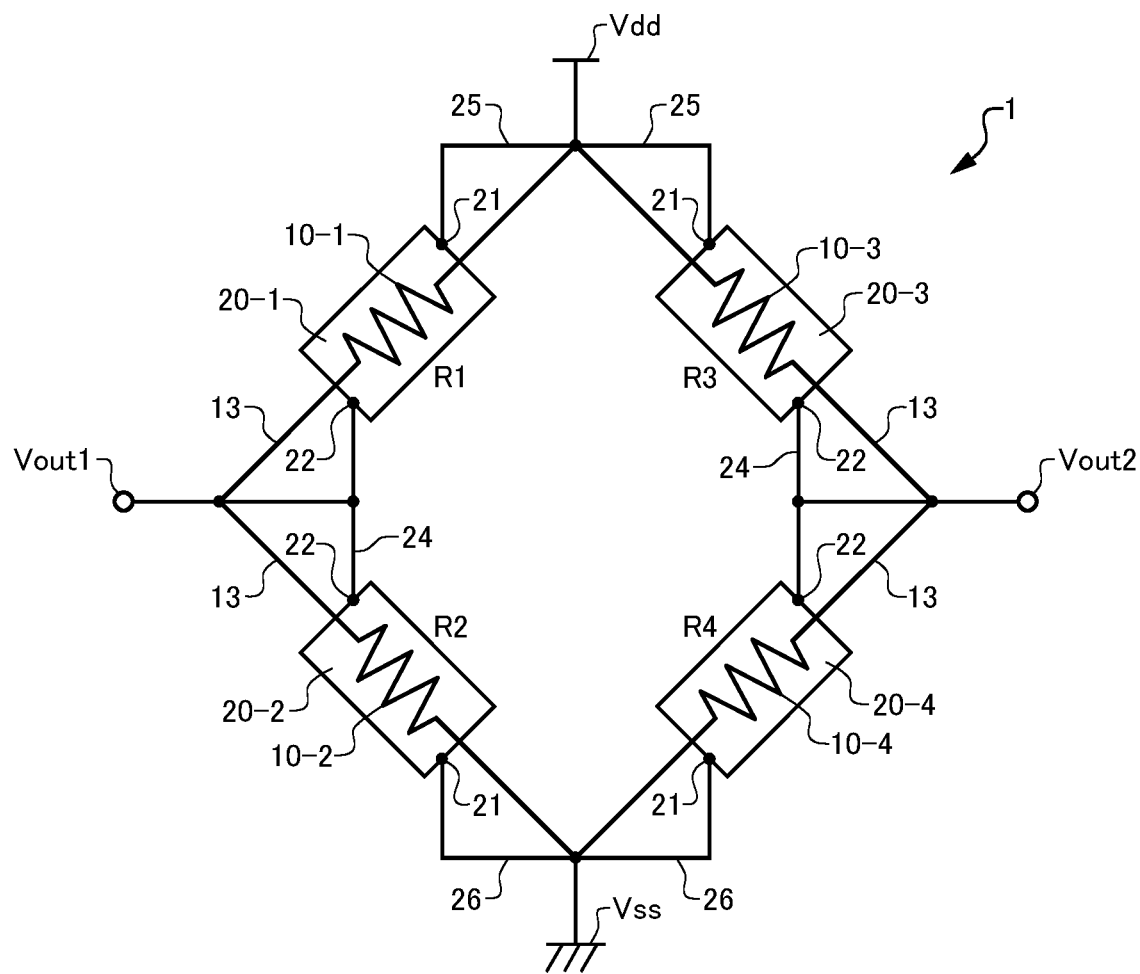
FIG. 15 shows an example of the circuit configuration of the semiconductor pressure sensor 1 according to an eighth embodiment.

FIG. 15 shows an example of the circuit configuration of the semiconductor pressure sensor 1 according to an eighth embodiment. In the present example, the other end 22 of the first shield film 20-1 and the other end 22 of the second shield film 20-2 are both electrically connected to the first middle-potential terminal Vout1, in the circuit configuration of the semiconductor pressure sensor 1 in the first embodiment shown in FIG. 1. Similarly, the other end 22 of the third shield film 20-3 and the other end 22 of the fourth shield film are both electrically connected to the second middle-potential terminal Vout2.

Note that, in the semiconductor pressure sensor 1 in the sixth embodiment shown in FIG. 13, the other end 22 of the first shield film 20-1 and the other end 22 of the fourth shield film 20-4 may both be electrically connected to the first middle-potential terminal Vout1. The other end 22 of the third shield film 20-3 and the other end 22 of the second shield film 20-2 may both be electrically connected to the second middle-potential terminal Vout2. On the other hand, the other end 22 of the first shield film 20-1 and the other end 22 of the fourth shield film 20-4 may both be electrically connected to the second middle-potential terminal Vout2. The other end 22 of the third shield film 20-3 and the other end 22 of the second shield film 20-2 may both be electrically connected to the first middle-potential terminal Vout1.

In the semiconductor pressure sensor 1 in the seventh embodiment shown in FIG. 14, the connection point 29 may be electrically connected to at least one of the first middle-potential terminal Vout1 and the second middle-potential terminal Vout2. As described above, the other end 22 of the first shield film 20-1, the other end 22 of the second shield film 20-2, the other end 22 of the third shield film 20-3 and the other end 22 of the fourth shield film 20-4 may be electrically connected to the first middle-potential terminal Vout1 or the second middle-potential terminal Vout2. Otherwise, the other end 22 of the first shield film 20-1, the other end 22 of the second shield film 20-2, the other end 22 of the third shield film 20-3 and the other end 22 of the fourth shield film 20-4 may be connected to a potential other than the first middle-potential terminal Vout1 and the second middle-potential terminal Vout2, unlike the present example.

According to the above configuration, two different parts of each of the first shield film 20-1 and the third shield film 20-3 are connected to different potentials, that is, to the high-potential side terminal Vdd and the first middle-potential terminal Vout1 (or the second middle-potential terminal Vout2). Similarly, two different parts of each of the second shield film 20-2 and the fourth shield film 20-4 are connected to different potentials, that is, to the low-potential side terminal Vss and the first middle-potential terminal Vout1 (or the second middle-potential terminal Vout2). Accordingly, a potential distribution can be generated in each shield film 20 in a stable manner.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

EXPLANATION OF REFERENCES

1: semiconductor pressure sensor, 10: piezo-resistive portion, 11: one end, 12: the other end, 13: resistive-portion wiring, 14: resistive-portion wiring, 15: resistive-portion wiring, 20: shield film, 21: one end, 22: the other end, 24: wiring portion, 25: wiring portion, 26: wiring portion, 29: connection point, 30: metal wiring, 32: metal wiring, 33: contact portion, 34: contact portion, 35: contact portion, 40: wiring portion, 41: wiring portion, 42: contact portion, 43: contact wiring portion, 44: shield-film wiring portion, 45: contact portion, 46: contact portion

What is claimed is:

1. A semiconductor device comprising:
    a semiconductor substrate having provided therein a hollowed portion;
    a plurality of piezo-resistive portions constituting a Wheatstone bridge circuit provided in a region of the semiconductor substrate above the hollowed portion;
    an insulating film provided above the piezo-resistive portion; and
    a plurality of conductive shield films provided above respective ones of the plurality of piezo-resistive portions with the insulating film intervening therebetween,
    wherein
    two different parts of each conductive shield film among the plurality of conductive shield films are connected to different potentials so that current flows in the plurality of conductive shield films.

2. The semiconductor device according to claim 1, wherein a potential difference is generated in the each conductive shield film in a direction same as a direction of a potential difference generated in the corresponding piezo-resistive portion.

3. The semiconductor device according to claim 1, wherein
    the plurality of piezo-resistive portions include:
        a first resistor electrically connected between a high-potential side terminal of the Wheatstone bridge circuit and a first middle-potential terminal of the Wheatstone bridge circuit;
        a second resistor electrically connected between the first middle-potential terminal and a low-potential side terminal of the Wheatstone bridge circuit;
        a third resistor electrically connected between the high-potential side terminal and a second middle-potential terminal of the Wheatstone bridge circuit; and
        a fourth resistor electrically connected between the second middle-potential terminal and the low-potential side terminal, and wherein
    two of the shield films are connected in series between the high-potential side terminal and the low-potential side terminal.

4. The semiconductor device according to claim 3, wherein
    the plurality of conductive shield films include a first shield film, a second shield film, a third shield film and a fourth shield film provided above respective ones of the first resistor, the second resistor, the third resistor and the fourth resistor,
    one end of the first shield film and one end of the third shield film are each electrically connected to the high-potential side terminal of the Wheatstone bridge circuit, and
    one end of the second shield film and one end of the fourth shield film are each electrically connected to the low-potential side terminal of the Wheatstone bridge circuit.

5. The semiconductor device according to claim 4, wherein
    another end of the first shield film and another end of the second shield film are electrically connected, and
    another end of the third shield film and another end of the fourth shield film are electrically connected.

6. The semiconductor device according to claim 5, wherein another end of the first shield film, another end of the second shield film, another end of the third shield film and another end of the fourth shield film are electrically connected to the first middle-potential terminal or the second middle-potential terminal.

7. The semiconductor device according to claim 4, wherein
    another end of the first shield film and another end of the fourth shield film are electrically connected, and
    another end of the third shield film and another end of the second shield film are electrically connected.

8. The semiconductor device according to claim 4, wherein another end of the first shield film, another end of the second shield film, another end of the third shield film and another end of the fourth shield film are electrically connected to each other.

9. The semiconductor device according to claim 3, wherein a potential difference is generated in the each conductive shield film in a direction same as a direction of a potential difference generated in the corresponding piezo-resistive portion.

10. The semiconductor device according to claim 1, further comprising:
    a resistance wiring portion as a diffused resistor connected to the piezo-resistive portion; and
    a wiring portion which is connected to the shield film and has a lower resistance value than a resistance value of the shield film, wherein
    in plan view, the combined area of the shield film and the wiring portion is smaller than the combined area of the piezo-resistive portion and the resistance wiring portion.

11. The semiconductor device according to claim 1, further comprising a wiring portion which is connected to the shield film and has a lower resistance value than a resistance value of the shield film, wherein
    the shield film and the wiring portion are formed of a polysilicon material that is continuous with each other, and
    a cross-sectional area of the wiring portion is larger than a cross-sectional area of the shield film.

12. The semiconductor device according to claim 1, further comprising a wiring portion connected to the shield film, wherein
    a polysilicon portion constituting the shield film has a smaller thickness than a polysilicon portion constituting the wiring portion.

13. The semiconductor device according to claim 1, further comprising a wiring portion which is connected to the shield film and has a lower resistance value than a resistance value of the shield film, wherein
    the shield film and the wiring portion are formed of a polysilicon material that is continuous with each other, and
    a doping concentration of the wiring portion is higher than a doping concentration of the shield film.

14. The semiconductor device according to claim 1, further comprising a wiring portion which is connected to the shield film and has a lower resistance value than a resistance value of the shield film, wherein
    the shield film is formed of polysilicon, and
    the wiring portion is formed of metal.

15. The semiconductor device according to claim 1, wherein a sheet resistance value of the shield film is 10 $\Omega$/square or more and 10 k$\Omega$/square or less.

* * * * *